(12) United States Patent
Naftz et al.

(10) Patent No.: US 6,458,271 B1
(45) Date of Patent: Oct. 1, 2002

(54) DEEP AQUIFER REMEDIATION SYSTEM

(75) Inventors: David L. Naftz, Park City, UT (US); James A. Davis, Menlo Park, CA (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/791,748

(22) Filed: Feb. 26, 2001

(51) Int. Cl.$^7$ .................................................. C02F 1/62
(52) U.S. Cl. ........................ 210/170; 210/199; 210/282; 210/912; 210/747; 588/17; 588/20
(58) Field of Search .................................... 210/170, 199, 210/206, 209, 282, 747, 912; 588/17, 20

(56) References Cited

U.S. PATENT DOCUMENTS

| | | | |
|---|---|---|---|
| 5,080,805 A | * | 1/1992 | Houser ........................ 210/206 |
| 5,527,457 A | * | 6/1996 | Holland ....................... 210/170 |
| 5,605,634 A | * | 2/1997 | Wilson et al. .............. 210/170 |
| 5,728,302 A | * | 3/1998 | Conner et al. .............. 210/747 |
| 5,783,088 A | * | 7/1998 | Amonette et al. .......... 210/747 |
| 5,803,174 A | * | 9/1998 | Gilmore et al. ............. 210/747 |
| 5,833,388 A | * | 11/1998 | Edwards et al. ............ 210/170 |
| 5,925,252 A | * | 7/1999 | Cline .......................... 210/206 |
| 6,296,760 B1 | * | 10/2001 | Petty et al. ................. 210/170 |

* cited by examiner

Primary Examiner—Christopher Upton
(74) Attorney, Agent, or Firm—Ross F. Hunt, Jr.

(57) ABSTRACT

A groundwater decontamination system includes a decontamination unit adapted to be lowered down through a non-pumping well into an aquifer containing contaminated water. The unit can also be raised up and out of the non-pumping well for cleaning, servicing or replacement. The decontamination unit includes a porous outer tube with a plurality of holes through which contaminated water flows, and a porous inner tube with a plurality of holes through which flows in-flowing contaminated water flowing through outer tube. A contaminant removing reactive barrier material is disposed within the inner tube for removing on contact contaminants from the in flowing water. A flow directing arrangement, preferably in the form of flow directing fins, directs in-flowing water from the holes in the outer tube to the holes in the inner tube (i.e., provider of the channeling of the ground water into the reactive barrier material). The system can monitor the contaminant removal, as well as other conditions of the groundwater.

9 Claims, 2 Drawing Sheets

DEEP AQUIFER REMEDIATION SYSTEM

FIELD OF THE INVENTION

In general, this invention relates to the removal of organic and inorganic contaminants from ground water. More particularly, this invention relates to a passive treatment system used with an array of non-pumping wells for such removal of contaminants.

BACKGROUND OF THE INVENTION

As interest in environmental issues has increased, so has interest in improved methods of cleaning the land, air and water. In this regard, the interest in improved methods of groundwater cleanup has been acute. Potable ground water supplies worldwide are contaminated by, or threatened by, advancing plumes containing radionuclides and metals. Unlike air, land and above ground water cleanups, removal of contaminants from groundwater areas presents special problems with respect to gaining access to the contaminated areas which can make these cleanups very difficult.

Once a contaminant enters a groundwater system, it can be transported by the groundwater to a great depth. Additionally, such activities as mining or deep underground disposal of radioactive or toxic materials can create a flow of contaminants through groundwater hundreds of feet below the surface. Contamination by uranium and other radioactive materials is particularly troubling because of the longevity of these materials.

Conventional methods for treating deep groundwater contamination are largely unsatisfactory because of cost and other considerations. Active methods that seek out the underground water and bring it to the surface for treatment are most commonly used. The active methods most frequently used are so-called pump and treat methods, trenching methods, or some mixture of the two.

In a pumping method, contaminated groundwater is pumped from the contaminated lower regions to the upper regions where the-ground water may be treated and returned. The water may be brought up to the surface using drilled holes, trenches, or other means that provide access to the water for the pumping equipment. Pump and treat systems suffer from several problems. The power requirements for a pump and treat operation are very high, and can be prohibitively expensive. This is particularly true of pump systems that treat deeper (>100 feet below land surface) groundwater. Further, these systems are costly and difficult to maintain.

Trenching is even more unsatisfactory in handling deep groundwater contamination. A trenching system employs a trench dug into the ground down to the point of contamination. The exposed water is pumped from the trench or treated on site as the water flows through the trench area. Disadvantages of trenching systems include the high costs of digging the trench, and of the heavy equipment required for digging the trenches and treating the water, as well as the expense of the elaborate monitoring network that is generally used and depth limitations of the trenching equipment. Other disadvantages include the great surface disturbance associated with trenching, the cost of recontouring the surface after trenching and the increased exposure of contaminants to workers associated with this apparatus.

Because of the high costs of active systems, interest has increased in passive systems that can treat underground water without a need for actual removal of the water. The use of arrays of non-pumped wells has been proposed as a method to remediate contaminated groundwater when pump and treat or trenching technologies are not possible because of technical or financial constraints such as, for example, when contaminant streams are >200 feet below the land surface.

Prior art of interest include U.S. Pat. No. 5,512,702 (Methods for in-situ immobilization of lead in contaminated soils, wastes, and sediments using solid calcium phosphate materials); U.S. Pat. No. 5,514,279 (System for treating contaminated groundwater); and U.S. Pat. No. 5,362,394 (System for treating contaminated groundwater).

In general, prior-art methods suffer important limitations. For example, the methods include the following: the methods are effective only with respect to a small number of contaminants, the methods offer no way of treating more water than the amount in immediate contact with the treatment surface and the treatment materials are difficult to replace.

It will be evident from the foregoing, there is a need in this art of contaminated groundwater treatment for a passive, low cost system of groundwater treatment which can treat a wide variety of underground contaminants including radioactive and hydrocarbon contaminants, which can treat a large amount of water per unit, and which offers simple retrieval, replacement, and disposal of the reactive material used. In this regard, an alternative, cost effective approach to pump-and-treat methods could be of widespread applicability to the treatment of contaminated groundwater associated with abandoned and active mine sites and fractured rock systems throughout the United States and other parts of the world.

SUMMARY OF THE INVENTION

According to the invention, a groundwater decontamination system is provided for remediation of groundwater at a wide range of depths and in fractured rock systems. Among other advantages, the system includes a treatment unit which can be lowered to a desired depth so that the water at that depth will undergo decontamination. The system is relatively inexpensive, and the replacement of decontamination materials of the treatment unit can be accomplished in a simple manner.

According to one aspect of the invention, a system is provided that contains a non-pumping well decontamination unit, at least one means for lowering said unit down through said non-pumping well into an aquifer containing contaminated water and means for raising said unit out of the non-pumping well. The decontamination unit has a porous outer tube having a plurality of holes therein through which contaminated water can flow, a porous inner tube having a plurality of holes through which can flow contaminated water flowing through said outer tube, contaminant removing barrier material dispersed within the inner tube for removing on contact contaminants from the in flowing water, and a flow directing means for directing in flowing water from the holes in the outer tube to the holes in the inner tube.

Preferably, the decontamination unit has a plurality of passive samplers for monitoring contaminant removal and/or other conditions of the groundwater. The unit has fin structures for allowing the channeling of ground water into the reactive barrier material. The unit can be either permanent or replaceable, depending upon the barrier material used and concentration of the contaminant being treated.

The system can be used as part of an array of decontamination systems and an array of unpumped wells for adjusting the size of the treatment area to the size of the contamination area.

Further features and advantages of the present invention will be set forth in, or apparent from, the detailed description of a preferred thereof which follows.

DESCRIPTION OF A PREFERRED EMBODIMENT

Figures 1, 2:
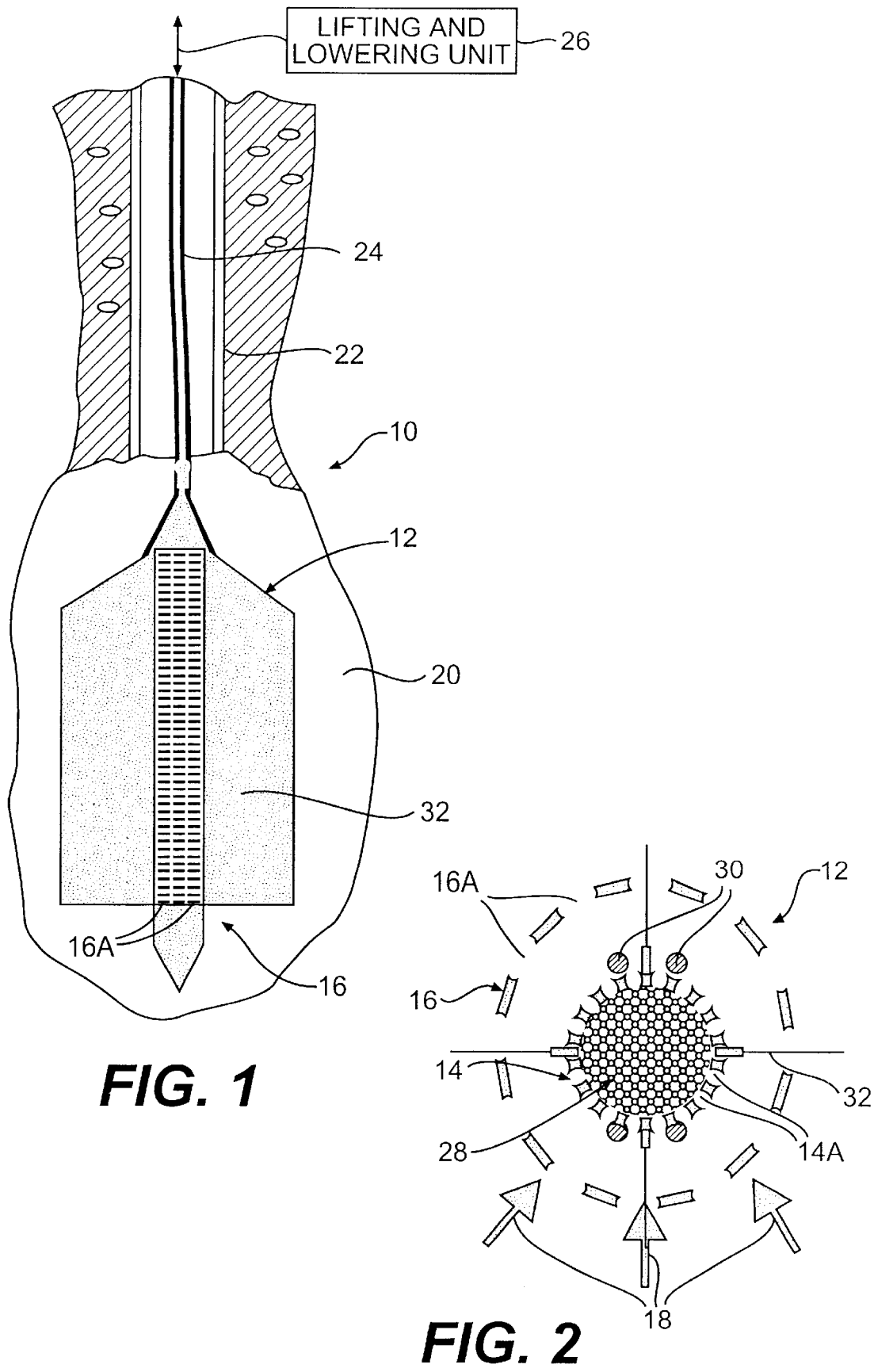
FIG. 1 is a schematic elevational side view, partially in cross section, of a system in accordance with the invention, wherein a treatment device is lowered into a treatment well.
FIG. 2 is a plan view of the treatment device of FIG. 1 with groundwater entering the device.
Figure 3:
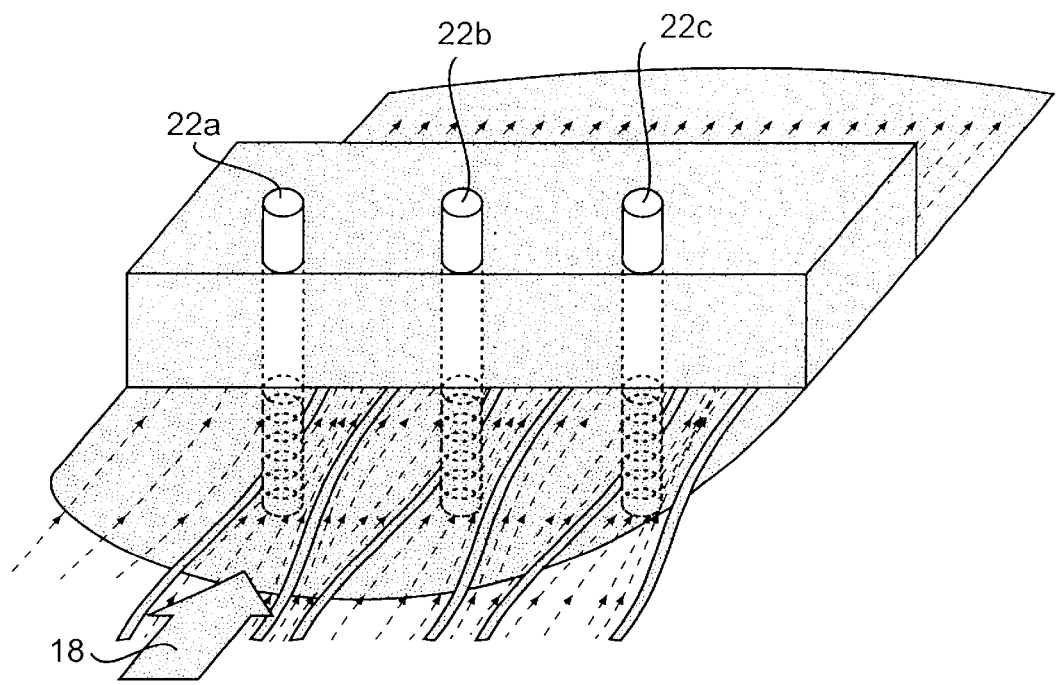
FIG. 3 is a perspective view of a line of wells corresponding to that shown in FIG. 1, with waterflow and hydraulic diversion towards the wells indicated therein.

Referring to the drawings and, in particular, to FIG. 1, there is shown a deep aquifer remediation tool (referred to hereinafter by the acronym DART) for decontaminating deep groundwater. The tool or system, which is generally denoted 10, normally includes a plurality of non-pumping wells, one of which is indicated at 22 in FIG. 1. Three such wells, denoted 22a, 22b and 22c, are shown in FIG. 3. The non-pumping wells 22a, 22b and 22c are located downstream of a contaminant plume (not shown) which flows, as indicated by the "flow" arrow 18, into an aquifer indicated at 20 in FIG. 1. Referring to FIG. 1, a decontamination unit 12 is shown as being disposed in aquifer 20 having been lowered by a cable or other connecting line 24 down through non-pumping well 22 into the aquifer 20 through which the contaminated groundwater flows. As water flows past and through the lowered unit 12, it is passively treated as described below. The system 10 includes a lifting and lowering unit 26 including a cable drum or reel (not shown) which is capable of lowering the decontamination unit 12 by means of cable 24 into the non-pumping well 22 to the proper depth and of raising the unit 12, when necessary, for replacement, maintenance, transfer or removal of the contents of decontamination unit 12 when the treatment is concluded.

Turning to FIG. 2, the decontamination unit 12 includes a porous outer tube 16 having therein a plurality of openings 16a. As contaminated water 18, as indicated by arrows, flows by the unit 12, a portion of the water flows into the outer tube openings 16a to the interior of the unit 12. The water 18 comes into contact with a porous inner tube 14 that also has therein a plurality of openings 14a. The water 18 flows through the openings of the inner tube 14 into the interior of the inner tube 14. The inner tube 14 is filled with permeable reactive material (PRM) 28. The water entering the inner tube 14 comes into contact with the PRM 28 which removes contaminants from the flow of water on contact. A large portion of the water that would otherwise flow by the inner tube 14 on either side thereof is halted and directed by a pair of oppositely extending fins or fin structures 32. The fins 32 extend from the inner tube 14 to the outer tube 16 and direct the flow of the water inward towards the intake openings 14a of the inner tube 14 so as to greatly increase the water flow entering the PRM 28. Outer fins or fin structures 36 attached to outer tube 16 can also be employed to direct the water to the unit 12. As shown in FIG. 1, the water flows through the PRM 28 and the treated water exits through inner tube openings 14 and then outer tube openings 16, respectively, on the other side of the unit 12.

The PRM 28 is a permanent, semi-permanent, or replaceable unit that contains a zone of reactive material which acts as a passive in-situ treatment zone. This in-situ treatment zone degrades or immobilizes contaminants, such as radionuclides and other trace elements or organic contaminants, as the ground water flows therethrough. Operational and maintenance costs are lower because water flow across the PRM 28 is driven by the natural hydraulic gradient between the well 22 and the aquifer 20, and because the treatment system does not require operational maintenance. Reactions within the PRB material either degrade contaminants to non-toxic forms or transfer the contaminants to an immobile phase. The PRM 28 can also be deployed in wells within a fractured rock aquifer.

In a preferred embodiment, the PRM 28 contains a barrier sandwich material with two distinct layers for increasing contaminant removal. By combining two or more reactive materials, the removal efficiency is increased. The use of the barrier sandwich increases the treatment capacity and allows for longer treatment periods before material replacement. This results in a more cost effective ground water treatment program.

As shown in FIG. 2, the decontamination unit 12 also includes a plurality of passive samplers 30 for monitoring contaminant removal.

The system allows the user to easily replace the barrier material of the PRM 28 after the material is spent. Replacement of spent material would be cost prohibitive without an engineered deployment device, but replacement of "fresh" reactive material is easy and cost effective using the DART 10.

Turning again to FIG. 3, the DART system is shown, in a schematic manner, as part of an array of decontamination systems used to clean a large underground area. The array of non-pumping wells 22a, 22b and 22c are drilled at a fixed distance from each other. It will, of course, be appreciated that the showing in FIG. 3 is schematic only and that the number and placement of the wells corresponding to well 22 would be chosen to account for such factors as the size and shape of the treatment area and the locations of fractures in a fractured rock system. A larger array of wells 20 is shown in FIG. 4.

Figure 4:
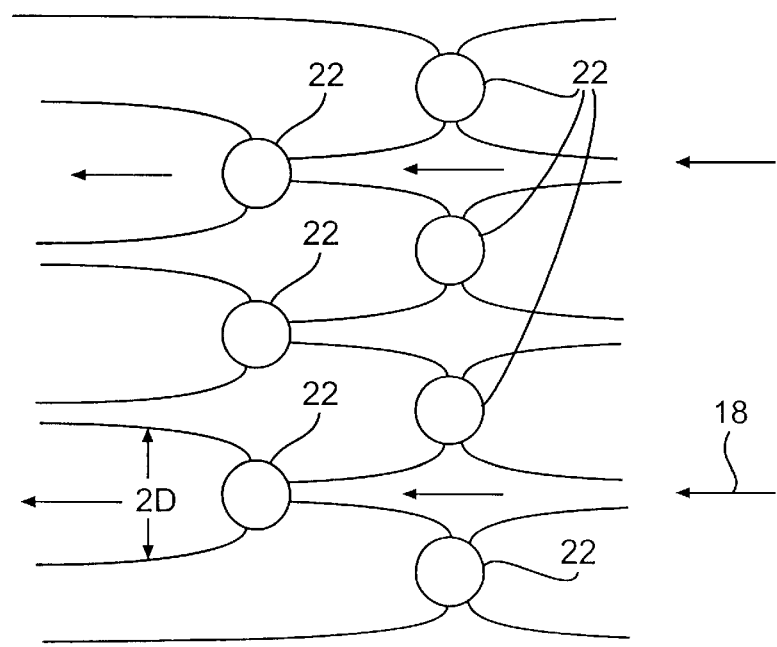
FIG. 4 is a flow diagram indicating hydraulic diversion of water in an aquifer towards the treatment wells.

Under natural flow conditions in an unconsolidated aquifer, a large portion of the contaminated groundwater moves along the flowlines shown in FIGS. 3 and 4. The water converges to the non-pumping well array of wells 22a, 22b and 22c (FIG. 3) and the associated DART (not shown in FIG. 3) in response to the difference in hydraulic conductivity between the wells and the aquifer. Numerical simulations conducted during development of the DART indicate that each well typically intercepts ground water in a portion of the upgradient aquifer approximately twice the inside diameter of the non-pumping well, as indicated in FIG. 4.

Since the remediation tools of the invention are deployed through wells, passive treatment of deeper contaminant streams (deeper than 100 feet) or in fractured rock systems that could not be treated with trenching techniques is now possible.

The invention can be used for a variety of remediation scenarios, contaminant types, and reactive materials. For example, the unit 12 could be filled with iron fillings and then used to treat water contaminated with specific organic compounds. Further, different reactive barrier materials can be "vertically stacked" within a DART, or vertical series of DARTs, for the treatment of chemically segregated contaminant plumes.

In the example of interest, the remediation system of the invention was employed at an abandoned uranium upgrader. The shallow ground water in the colluvial aquifer is contaminated with elevated concentrations of uranium that can exceed 20,000 micrograms per liter ($\mu$g/L). Two different iron sources (natural red sand and manufactured iron oxide pellets) mixed with bone char phosphate were utilized as the PRM 28. Initial results indicate that iron oxide pellets are a superior iron source.

Barrier Deployment Tubes in Non-pumping Wells

Considering the installation and operation for this example, an array of 6-inch-diameter wells, corresponding to well 22 and installed using a cable tool drilling rig, was used to deploy three additional DARTs as indicated schematically in FIG. 3. Barrier deployment tubes 12 containing a PRM 28 comprising different proportions of bone char phosphate and foamed iron oxide pellets were placed in the large-diameter wells 22. As indicated above, the use of arrays of unpumped wells to remediate contaminant plumes is particularly advantageous when the installation of treatment walls is not possible because of technical, asthetic or financial constraints.

Under natural flow conditions at the site, ground water converges to the non-pumping well array and the associated barrier deployment tubes 12 in response to the difference in hydraulic conductivity between the well and aquifer. Numerical simulations of ground-water movement through the non-pumping well array indicate that each well intercepts ground water in a portion of the upgradient aquifer approximately twice the inside diameter of the well.

Different proportions of bone char phosphate and iron oxide pellets were used to facilitate increased uranium removal from ground water. The iron oxide pellets strongly =adsorb the phosphate released form the phosphate pellets. The adsorbed phosphate can then react with the uranium in the ground water to facilitate formation of insoluble uranyl phosphate compounds. The following proportions of bone char phosphate: iron oxide pellets (volume ratio) were used: (1) 25:75 (intermixed); well BZ2; (2) 50:50 (intermixed), well BZ1; and (3) 50:50 (layered vertically), well BZ3. Each barrier package has five monitoring points for the collection of water samples.

Three months of uranium-concentration data collected from the three barrier deployment tubes that were installed in mine non-pumping well array have yielded the following results: During the first three months of operation, the DARTs removed an average of 95 percent of the input uranium.

The invention has currently been tested at depths down to 450 feet below land surface. There is no reason to believe that the invention will not function at greater depths.

Although the invention has been described above in relation to preferred embodiments thereof, it will be understood by those skilled in the art that variations and modifications can be effected without departing from the scope and spirit of the invention.

What is claimed is:

1. A groundwater decontamination system comprising at least one non-pumping well, a decontamination unit, means for lowering said decontamination unit down through said non-pumping well into an aquifer containing contaminated water such that the unit can be located in the contaminated water at a selected depth and for raising said unit out of said non-pumping well, said decontamination unit comprising a porous outer tube having a plurality of holes therein through which contaminated water can flow, a porous inner tube having a plurality of holes through which can flow in-flowing contaminated water flowing through said outer tube, a contaminant removing barrier disposed within the inner tube for removing, on contact, contaminants from the in-flowing water such that the water flows through the outer tube, the inner tube, and the barrier and back out of the barrier, back through the inner tube and the outer tube to exit from the unit, and a flow directing means for directing in flowing water from the holes in said outer tube to said inner tube and thus to the contaminant removing barrier, said barrier including a material for decontaminating a radionuclide contained in the contaminated water.

2. A groundwater decontamination system according claim 1, wherein the decontamination unit further comprises a plurality of passive samplers for monitoring contaminant removal.

3. A groundwater decontamination system according to claim 1, wherein said flow direction means of the decontamination unit comprises fin structures for channeling of ground water into said barrier.

4. A groundwater decontamination system according to claim 1, wherein the decontamination unit is permanent.

5. A groundwater decontamination system according to claim 1, wherein the decontamination unit is replaceable.

6. A groundwater decontamination system according to claim 1, wherein the system comprises an array of said unpumped wells defining a treatment area and arranged so as to match the size of the treatment area to the size of the contamination area.

7. A groundwater decontamination system according to claim 1, wherein the radionuclide is uranium.

8. A groundwater decontamination unit comprising a porous outer tube having a plurality of holes for receiving a flow of contaminated water, a porous inner tube having a plurality of holes for receiving water from said outer tube, a barrier material disposed in the inner tube for removing contaminants from said flow of water on contact therein, and a plurality of fins for directing said water from the holes in said outer tube to the holes in said inner tube.

9. A groundwater decontamination system comprising at least one non-pumping well, a decontamination unit, means for lowering said decontamination unit down through said non-pumping well into an aquifer containing contaminated water and for raising said unit out of said non-pumping well, said decontamination unit comprising a porous outer tube having a plurality of holes therein through which contaminated water can flow, a porous inner tube having a plurality of holes through which can flow in-flowing contaminated water flowing through said outer tube, a contaminant removing barrier disposed within the inner tube for removing, on contact, contaminants from the in-flowing water, and a flow directing means for directing in flowing water from the holes in said outer tube to said inner tube and thus to the contaminant removing barrier, said flow direction means of the decontamination unit comprising fin structures for channeling of ground water into said barrier.

* * * * *